US008621188B2

(12) United States Patent
Srinivasan et al.

(10) Patent No.: US 8,621,188 B2
(45) Date of Patent: Dec. 31, 2013

(54) CERTIFICATE VERIFICATION

(75) Inventors: Pramila Srinivasan, Palo Alto, CA (US); John Princen, Cupertino, CA (US)

(73) Assignee: Acer Cloud Technology, Inc., Mountain View, CA (US)

( * ) Notice: Subject to any disclaimer, the term of this patent is extended or adjusted under 35 U.S.C. 154(b) by 495 days.

(21) Appl. No.: 12/576,344

(22) Filed: Oct. 9, 2009

(65) Prior Publication Data

US 2010/0095125 A1    Apr. 15, 2010

Related U.S. Application Data

(62) Division of application No. 11/601,323, filed on Nov. 16, 2006, now Pat. No. 7,613,915.

(60) Provisional application No. 60/857,840, filed on Nov. 9, 2006.

(51) Int. Cl.
*G06F 9/00* (2006.01)

(52) U.S. Cl.
USPC ............................. 713/1; 713/173

(58) Field of Classification Search
None
See application file for complete search history.

(56) References Cited

U.S. PATENT DOCUMENTS

| | | | |
|---|---|---|---|
| 4,723,284 A | 2/1988 | Munck et al. |
| 5,095,798 A | 3/1992 | Okada et al. |
| 5,184,830 A | 2/1993 | Okada et al. |
| 5,238,250 A | 8/1993 | Leung et al. |
| 5,261,069 A | 11/1993 | Wilkinson et al. |
| 5,367,698 A | 11/1994 | Webber et al. |
| 5,400,402 A | 3/1995 | Garfinkle |
| 5,404,505 A | 4/1995 | Levinson |
| 5,426,763 A | 6/1995 | Okada et al. |
| 5,497,422 A | 3/1996 | Tysen et al. |
| 5,528,513 A | 6/1996 | Vaitzblit et al. |
| 5,577,209 A | 11/1996 | Boyle et al. |
| 5,586,264 A | 12/1996 | Belknap et al. |
| 5,590,199 A | 12/1996 | Krajewski, Jr. et al. |
| 5,610,839 A | 3/1997 | Karolak et al. |

(Continued)

FOREIGN PATENT DOCUMENTS

| | | | |
|---|---|---|---|
| EP | 0992922 A2 | 4/2000 |
| EP | 1091274 A2 | 4/2001 |

(Continued)

OTHER PUBLICATIONS

Gligor (Virgil D. Gligor, "20 Years of Operating Systems Security" University of Maryland, published by IEEE on 1999).*

(Continued)

*Primary Examiner* — Peter Poltorak
(74) *Attorney, Agent, or Firm* — Sheppard, Mullin, Richter & Hampton LLP

(57) ABSTRACT

An improved secure programming technique involves reducing the size of bits programmed in on-chip secret non-volatile memory, at the same time enabling the typical secure applications supported by secure devices. A technique for secure programming involves de-coupling chip manufacture from the later process of connecting to ticket servers to obtain tickets. A method according to the technique may involve sending a (manufacturing) server signed certificate from the device prior to any communication to receive tickets. A device according to the technique may include chip-internal non-volatile memory to store the certificate along with the private key, in the manufacturing process.

20 Claims, 7 Drawing Sheets

(56) References Cited

U.S. PATENT DOCUMENTS

| | | | |
|---|---|---|---|
| 5,638,443 | A | 6/1997 | Stefik et al. |
| 5,715,398 | A | 2/1998 | Lubenow et al. |
| 5,715,403 | A | 2/1998 | Stefik |
| 5,765,152 | A | 6/1998 | Erickson |
| 5,781,901 | A | 7/1998 | Kuzma |
| 5,786,587 | A | 7/1998 | Colgate, Jr. |
| 5,787,172 | A | 7/1998 | Arnold |
| 5,790,170 | A | 8/1998 | Suzuki |
| 5,799,086 | A | 8/1998 | Sudia |
| 5,805,712 | A | 9/1998 | Davis |
| 5,809,242 | A | 9/1998 | Shaw et al. |
| 5,815,662 | A | 9/1998 | Ong |
| 5,818,512 | A | 10/1998 | Fuller |
| 5,829,046 | A | 10/1998 | Tzelnic et al. |
| 5,867,223 | A | 2/1999 | Schindler et al. |
| 5,892,900 | A | 4/1999 | Ginter et al. |
| 5,903,723 | A | 5/1999 | Beck et al. |
| 5,905,860 | A | 5/1999 | Olsen et al. |
| 5,909,491 | A | 6/1999 | Luo |
| 5,913,039 | A | 6/1999 | Nakamura et al. |
| 5,933,498 | A | 8/1999 | Schneck et al. |
| 5,983,227 | A | 11/1999 | Nazem et al. |
| 6,014,558 | A | 1/2000 | Thomas |
| 6,016,348 | A | 1/2000 | Blatter et al. |
| 6,029,046 | A | 2/2000 | Khan et al. |
| 6,032,200 | A | 2/2000 | Lin |
| 6,038,601 | A | 3/2000 | Lambert et al. |
| 6,044,157 | A | 3/2000 | Uesaka et al. |
| 6,049,821 | A | 4/2000 | Theriault et al. |
| 6,052,720 | A | 4/2000 | Traversat et al. |
| 6,085,193 | A | 7/2000 | Malkin et al. |
| 6,141,756 | A | 10/2000 | Bright et al. |
| 6,148,340 | A | 11/2000 | Bittinger et al. |
| 6,157,721 | A | 12/2000 | Shear et al. |
| 6,167,441 | A | 12/2000 | Himmel |
| 6,185,625 | B1 | 2/2001 | Tso et al. |
| 6,195,433 | B1 | 2/2001 | Vanstone et al. |
| 6,205,475 | B1 | 3/2001 | Pitts |
| 6,212,657 | B1 | 4/2001 | Wang et al. |
| 6,219,680 | B1 | 4/2001 | Bernardo et al. |
| 6,219,708 | B1 | 4/2001 | Martenson |
| 6,226,618 | B1 | 5/2001 | Downs et al. |
| 6,243,467 | B1 | 6/2001 | Reiter et al. |
| 6,243,719 | B1 | 6/2001 | Ikuta et al. |
| 6,252,961 | B1 | 6/2001 | Hogan |
| 6,256,637 | B1 | 7/2001 | Venkatesh et al. |
| 6,259,471 | B1 | 7/2001 | Peters et al. |
| 6,278,782 | B1 | 8/2001 | Ober et al. |
| 6,289,452 | B1 | 9/2001 | Arnold et al. |
| 6,292,899 | B1 | 9/2001 | McBride |
| 6,310,956 | B1 | 10/2001 | Morito et al. |
| 6,321,209 | B1 | 11/2001 | Pasquali |
| 6,330,566 | B1 | 12/2001 | Durham |
| 6,338,050 | B1 | 1/2002 | Conklin et al. |
| 6,351,539 | B1 * | 2/2002 | Djakovic ...................... 380/268 |
| 6,371,854 | B1 | 4/2002 | Ikeda et al. |
| 6,377,972 | B1 | 4/2002 | Guo et al. |
| 6,389,460 | B1 | 5/2002 | Stewart et al. |
| 6,389,538 | B1 | 5/2002 | Gruse et al. |
| 6,397,186 | B1 | 5/2002 | Bush et al. |
| 6,412,008 | B1 | 6/2002 | Fields et al. |
| 6,412,011 | B1 | 6/2002 | Agraharam et al. |
| 6,427,238 | B1 | 7/2002 | Goodman et al. |
| 6,442,691 | B1 | 8/2002 | Blandford |
| 6,446,113 | B1 | 9/2002 | Ozzie et al. |
| 6,466,048 | B1 | 10/2002 | Goodman et al. |
| 6,480,883 | B1 | 11/2002 | Tsutsumitake et al. |
| 6,500,070 | B1 | 12/2002 | Tomizawa et al. |
| 6,510,502 | B1 | 1/2003 | Shimizu |
| 6,526,581 | B1 | 2/2003 | Edson |
| 6,544,126 | B2 | 4/2003 | Sawano et al. |
| 6,557,104 | B2 | 4/2003 | Vu et al. |
| 6,571,279 | B1 | 5/2003 | Herz et al. |
| 6,574,605 | B1 | 6/2003 | Sanders et al. |
| 6,594,682 | B2 | 7/2003 | Peterson et al. |
| 6,606,644 | B1 | 8/2003 | Ford et al. |
| 6,637,029 | B1 | 10/2003 | Maissel et al. |
| 6,654,388 | B1 | 11/2003 | Lexenberg et al. |
| 6,669,096 | B1 | 12/2003 | Saphar et al. |
| 6,675,350 | B1 | 1/2004 | Abrams et al. |
| 6,691,312 | B1 | 2/2004 | Sen et al. |
| 6,697,948 | B1 | 2/2004 | Rabin et al. |
| 6,704,797 | B1 | 3/2004 | Fields et al. |
| 6,711,400 | B1 * | 3/2004 | Aura ........................... 455/411 |
| 6,751,729 | B1 | 6/2004 | Giniger et al. |
| 6,760,324 | B1 | 7/2004 | Scott et al. |
| 6,785,712 | B1 | 8/2004 | Hogan et al. |
| 6,805,629 | B1 | 10/2004 | Weiss |
| 6,811,486 | B1 | 11/2004 | Luciano, Jr. |
| 6,823,454 | B1 | 11/2004 | Hind et al. |
| 6,826,593 | B1 | 11/2004 | Acharya et al. |
| 6,832,241 | B2 | 12/2004 | Tracton et al. |
| 6,859,535 | B1 | 2/2005 | Tatebayashi et al. |
| 6,873,975 | B1 | 3/2005 | Hatakeyama et al. |
| 6,892,301 | B1 | 5/2005 | Hansmann et al. |
| 6,901,386 | B1 | 5/2005 | Dedrick et al. |
| 6,920,567 | B1 | 7/2005 | Doherty et al. |
| 6,928,551 | B1 | 8/2005 | Lee et al. |
| 6,938,021 | B2 | 8/2005 | Shear et al. |
| 6,948,070 | B1 | 9/2005 | Ginter et al. |
| 6,993,557 | B1 | 1/2006 | Yen |
| 7,020,480 | B2 | 3/2006 | Coskun et al. |
| 7,024,394 | B1 | 4/2006 | Ashour et al. |
| 7,039,708 | B1 | 5/2006 | Knobl et al. |
| 7,051,212 | B2 | 5/2006 | Ginter et al. |
| 7,062,500 | B1 | 6/2006 | Hall et al. |
| 7,069,451 | B1 | 6/2006 | Ginter et al. |
| 7,092,953 | B1 | 8/2006 | Haynes |
| 7,099,479 | B1 | 8/2006 | Ishibashi et al. |
| 7,120,802 | B2 | 10/2006 | Shear et al. |
| 7,124,304 | B2 | 10/2006 | Bel et al. |
| 7,231,371 | B1 | 6/2007 | Cantini et al. |
| 7,322,042 | B2 | 1/2008 | Srinivasan et al. |
| 7,330,717 | B2 | 2/2008 | Gidron et al. |
| 7,380,275 | B2 | 5/2008 | Srinivasan et al. |
| 7,398,396 | B2 | 7/2008 | Arditi et al. |
| 7,415,620 | B2 | 8/2008 | England et al. |
| 7,424,615 | B1 | 9/2008 | Jalbert et al. |
| 7,440,452 | B1 | 10/2008 | Giniger et al. |
| 7,636,843 | B1 | 12/2009 | Asano et al. |
| 7,644,429 | B2 | 1/2010 | Bayassi et al. |
| 8,122,244 | B2 | 2/2012 | Azema et al. |
| 2001/0011255 | A1 | 8/2001 | Asay et al. |
| 2001/0014882 | A1 | 8/2001 | Stefik et al. |
| 2001/0026287 | A1 | 10/2001 | Watanabe |
| 2002/0016818 | A1 | 2/2002 | Kirani et al. |
| 2002/0032784 | A1 | 3/2002 | Darago et al. |
| 2002/0049909 | A1 | 4/2002 | Jackson et al. |
| 2002/0057799 | A1 | 5/2002 | Kohno |
| 2002/0059384 | A1 | 5/2002 | Kaars |
| 2002/0071557 | A1 | 6/2002 | Nguyen |
| 2002/0085720 | A1 | 7/2002 | Okada et al. |
| 2002/0116615 | A1 | 8/2002 | Nguyen et al. |
| 2002/0137566 | A1 | 9/2002 | Tomizawa et al. |
| 2002/0138764 | A1 | 9/2002 | Jacobs et al. |
| 2002/0144121 | A1 | 10/2002 | Ellison et al. |
| 2002/0154799 | A1 | 10/2002 | Anderson et al. |
| 2002/0160833 | A1 | 10/2002 | Lloyd et al. |
| 2002/0161673 | A1 | 10/2002 | Lee et al. |
| 2002/0162115 | A1 | 10/2002 | Bruckner et al. |
| 2002/0165022 | A1 | 11/2002 | Hiraoka |
| 2002/0165028 | A1 | 11/2002 | Miyamoto et al. |
| 2002/0169974 | A1 | 11/2002 | McKune |
| 2002/0184160 | A1 | 12/2002 | Tadayon et al. |
| 2003/0009423 | A1 | 1/2003 | Wang et al. |
| 2003/0023427 | A1 | 1/2003 | Cassin et al. |
| 2003/0023564 | A1 | 1/2003 | Padhye et al. |
| 2003/0028622 | A1 | 2/2003 | Inoue et al. |
| 2003/0041110 | A1 | 2/2003 | Wenocur et al. |
| 2003/0045355 | A1 | 3/2003 | Comair |
| 2003/0107951 | A1 | 6/2003 | Sartschev et al. |
| 2003/0114227 | A1 | 6/2003 | Rubin |
| 2003/0120541 | A1 | 6/2003 | Siann et al. |
| 2003/0144869 | A1 | 7/2003 | Fung et al. |

(56) References Cited

U.S. PATENT DOCUMENTS

| | | | |
|---|---|---|---|
| 2003/0157985 | A1 | 8/2003 | Shteyn |
| 2003/0163701 | A1* | 8/2003 | Ochi et al. .................. 713/175 |
| 2003/0166398 | A1 | 9/2003 | Netanel |
| 2003/0182142 | A1 | 9/2003 | Valenzuela et al. |
| 2003/0196085 | A1 | 10/2003 | Lampson et al. |
| 2003/0220142 | A1 | 11/2003 | Siegel |
| 2003/0225691 | A1 | 12/2003 | Ruellan et al. |
| 2004/0015426 | A1 | 1/2004 | Tadayon et al. |
| 2004/0039929 | A1 | 2/2004 | Decime |
| 2004/0044901 | A1 | 3/2004 | Serkowski et al. |
| 2004/0054923 | A1 | 3/2004 | Seago et al. |
| 2004/0083388 | A1 | 4/2004 | Nguyen |
| 2004/0098297 | A1 | 5/2004 | Borthwick |
| 2004/0098580 | A1 | 5/2004 | DeTreville |
| 2004/0098610 | A1 | 5/2004 | Hrastar |
| 2004/0102987 | A1 | 5/2004 | Takahashi et al. |
| 2004/0116119 | A1 | 6/2004 | Lewis et al. |
| 2004/0193890 | A1 | 9/2004 | Girault |
| 2005/0004875 | A1 | 1/2005 | Kontio et al. |
| 2005/0010801 | A1 | 1/2005 | Spies et al. |
| 2005/0027991 | A1 | 2/2005 | DiFonzo |
| 2005/0038753 | A1 | 2/2005 | Yen et al. |
| 2005/0066164 | A1 | 3/2005 | Simon |
| 2005/0071640 | A1 | 3/2005 | Sprunk et al. |
| 2005/0097618 | A1 | 5/2005 | Arling et al. |
| 2005/0122977 | A1 | 6/2005 | Lieberman |
| 2005/0135608 | A1 | 6/2005 | Zheng |
| 2005/0232284 | A1 | 10/2005 | Karaoguz et al. |
| 2006/0026691 | A1 | 2/2006 | Kim et al. |
| 2006/0031222 | A1 | 2/2006 | Hannsmann |
| 2006/0080529 | A1 | 4/2006 | Yoon et al. |
| 2006/0090084 | A1 | 4/2006 | Buer |
| 2006/0106836 | A1 | 5/2006 | Masugi et al. |
| 2006/0129848 | A1 | 6/2006 | Paksoy et al. |
| 2006/0136570 | A1 | 6/2006 | Pandya |
| 2006/0153368 | A1 | 7/2006 | Beeson |
| 2006/0236122 | A1 | 10/2006 | Field et al. |
| 2007/0005504 | A1 | 1/2007 | Chen et al. |
| 2007/0016832 | A1 | 1/2007 | Weiss |
| 2007/0028095 | A1 | 2/2007 | Allen et al. |
| 2007/0055867 | A1 | 3/2007 | Kanungo et al. |
| 2007/0067826 | A1 | 3/2007 | Conti |
| 2007/0150730 | A1 | 6/2007 | Conti |
| 2008/0096608 | A1 | 4/2008 | Wendling |
| 2008/0275750 | A1 | 11/2008 | Robinson et al. |
| 2009/0031409 | A1 | 1/2009 | Murray |
| 2009/0106548 | A1 | 4/2009 | Arditti et al. |
| 2012/0198229 | A1 | 8/2012 | Takashima |

FOREIGN PATENT DOCUMENTS

| | | |
|---|---|---|
| JP | 2002024178 A | 1/2002 |
| WO | 0213445 A2 | 2/2002 |
| WO | WO-0229642 A2 | 4/2002 |
| WO | WO-0230088 A1 | 4/2002 |
| WO | 2004040397 | 5/2004 |

OTHER PUBLICATIONS

Smith (Smith et al., "Validating a High-Perforance, Programmable Secure Coprocessor," Secure Systems and Smart Cards, IBM T.J. Watson Research Center, NY, Oct. 1999).*
Tygar (Tygar et al., "Strongbox: A System for Self-Securing Programs", 1991).*
Gligor, Virgil D., "20 Years of Operating Systems Security," University of Maryland.
Smith, Sean W., et al., "Using a High-Performance, Programmable Secure Coprocessor," Proceedings of the Second International Conference on Financial Cryptography.
Smith, Sean, et al., "Validating a High-Performance, Programmable Secure Coprocessor," Secure Systems and Smart Cards, IBM T.J. Watson Research Center, NY.
Tygar, J.D., et al., "Strongbox: A System for Self-Securing Programs," pp. 163-197.
Van Doorn Leendert, "A Secure Java.TM. Virtual Machine," Proceedings of the 9.sup.th USENIX Security Symposium (2000).
Co-pending U.S. Appl. No. 10/360,827 ,filed Feb. 7, 2003.
Search Report and Written Opinion mailed Oct. 28, 2008 from International Serial No. PCT/US2007/020074 filed Sep. 13, 2007.
Menezes, Alfred J. et al., "Handbook of Applied Cryptography," ISBN 0849385237, pp. 397-402, Oct. 1996.
Office Action mailed Mar. 27, 2012 from U.S. Appl. No. 12/576,356, filed Oct. 9, 2009.
Schneier, Bruce, "Applied Cryptography: Protocols, Algorithms and Source Code in C," 2nd edition, ISBN 0471128457, p. 175 (1996).
Arbaugh, William A., et al., "A Secure and Reliable Bootstrap Architecture," University of Pennsylvania (1996).
Aziz, Ashar, et al., "Privacy and Authentication for Wireless Local Area Networks," Sun Microsystems, Inc., (1993).
Bharadvaj et al., Proceedings of the 17.sup.th IEEE Symposium on Reliable Distributed Systems, pp. 118-123 (1998).
Davida, George I., et al., "Defending Systems Against Viruses through Cryptographic Authentication," IEEE pp. 312-318 (1989).
Diffie, Whitfield, "The First Ten Years of Public-Key Cryptography," Proceedings of the IEEE, vol. 96, No. 5, pp. 560-577 (May 1988).
Diffie, Whitfield, et al., "New Directions in Cryptography," (1976).
Dodson, David A, "Gain Some Perspective With Innovation's GBA to TV Converter" Jun. 6, 2002, http://www.viewonline.com/page/articles/innovationsGBATV.htm>, Accessed Mar. 29, 2008.
Dyer, Joan G., et al., "Building the IBM 4758 Secure Coprocessor," Computer, pp. 2-12 (Oct. 2001).
Frantzen, Mike, et al., "StackGhost: Hardware Facilitated Stack Protection," Proceedings of the 10.sup.th USENIX Security Symposium (2001).
Fujimura, Ko., et al., "Digital-Ticket-Controlled Digital Ticket Circulation," Proceedings of the 8.sup.th USENIX Security Symposium (1999).
Game Boy, <http://en.wikipedia.org/wiki/Game_Boy_Advanced> Accessed Mar. 30, 2008.
Game Boy Advance, <http://en.wikipedia.org/wiki/Game_Boy_Advanced> Accessed Mar. 30, 2008.
Game Cube, <http://en.wikipedia.org/wiki/Game_Cube> Accessed Mar. 28, 2008.
Gligor, Virgil D., "20 Years of Operating Systems Security," University of Maryland, 1999.
Gutmann, Peter, "The Design of a Cryptographic Security Architecture," Proceedings of the 8.sup.th USENIX Security Symposium (1999).
Hori et al., Computer Networks, 33(1-6):197-211 (2000).
Itoi, Naomaru, "SC-CFS: Smartcard Secured Cryptographic File System," Proceedings of the 10.sup.th USENIX Security Symposium (2001).
Jaeger, Trent, et al., "Building Systems that Flexibly Control Downloaded Executable Context," Proceedings of the 6.sup.th USENIX UNIX Security Symposium (1996).
Karger, Paul A., "New Methods for Immediate Revocation," IEEE (1989).
Kent, Stephen Thomas, "Protecting Externally Supplied Software in Small Computers," Massachusetts Institute of Technology (1980).
Kogan, Noam, et al., "A Practical Revocation Scheme for Broadcast Encryption Using Smart Cards," Proceedings of the 2003 IEEE Symposium on Security and Privacy (2003).
Lampson, Butler, et al., "Authentication in Distributed Systems Theory and Practice," Digital Equipment Corporation (1992).
Lotspiech, Jeffrey, et al., "Anonymous Trust: Digital Rights Management Using Broadcast Encryption," Proceedings of the IEEE, vol. 92, No. 6, pp. 898-909 (Jun. 2004).
Lotspiech, Jeffrey, et al., "Broadcast Encryption's Bright Future," Computer, pp. 57-63 (Aug. 2002).
Monrose, et al., "Toward Speech-Generated Cryptographic Keys on Resource Constrained Devices," Proceedings of the 11.sup.th USENIX Security Symposium (2002).
Neboyskey, "A leap Forward: Why States Should Ratify the Uniform Computer Information Transaction Act", May 2000, Federal Communications Law Journal, v52n3, pp. 793-820.
Neumann, P.G., et al., "A Provably Secure Operating System," Stanford Research Institute (1975).

(56) References Cited

OTHER PUBLICATIONS

Nonnenmacher, Jorg et al., "Asynchronous Multicast Push: AMP." 13.sup.th International Conference on Computer Commnication, Nov. 18-21, 1997, pp. 419-430,13, Proceedings of International Conference on Computer Communication, Cannes.

Palmer, Elaine R., "An Introduction to Citadel—A Secure Crypto Coprocessor for Workstations," IBM Research Division (1992).

Peterson, David S., et al., "A Flexible Containment Mechanism for Executing Untrusted Code," Proceedings of the 11.sup.th USENIX Security Symposium (2002).

Rodriguez, Pablo et al. Improving the WWW: Caching or Multicast? Computer Networks and ISDN Systems, Nov. 25, 1998, 30(22-23):2223-2243.

Rubin, Aviel D., "Trusted Distribution of Software Over the Internet," Internet Society 1995 Symposium on Network and Distributed System Security.

Smith, Sean W., "Secure Coprocessing Applications and Research Issues," Los Alamos Unclassified Release LA-UR-96-2805 (1996).

Smith, Sean W., et al., "Building a High-Performance, Programmable Secure Coprocessor," Secure Systems and Smart Cards, IBM T.J. Watson Research Center, NY (1998).

Smith, Sean W., et al., "Using a High-Performance, Programmable Secure Coprocessor," Proceedings of the Second International Conference on Financial Cryptography, 1997.

Smith, Sean, et al., "Validating a High-Performance, Programmable Secure Coprocessor," Secure Systems and Smart Cards, IBM T.J. Watson Research Center, NY, Oct. 1999.

Stefik, Mark, "Trusted Systems," Scientific American, pp. 78-81 (Mar. 1997).

Traylor, Scott, "Graphic Resolution and File Sizes", http://www.traylormm.com/harvard/53graphicresolution/, no date provided.

Tygar, J.D. et al., "Dyad: A System for Using Physically Secure Coprocessors," School of Computer Science, Carnegie Mellon University (1991).

Tygar, J.D., et al., "Strongbox: A System for Self-Securing Programs," pp. 163-197, 1991.

Van Doom, Leendert, "A Secure Java.TM. Virtual Machine," Proceedings of the 9.sup.th USENIX Security Symposium (2000).

Wang, Zheng et al. "Prefetching in World Wide Web." Global TeleCommnications Conference, Nov. 18-22, 1996, pp. 28-32, London.

White, et al., "ABYSS: An Architecture for Software Protection," IEEE Transactions on Software Engineering, vol. 16, No. 6, pp. 619-629(1990).

White, Steve R., et al., "Introduction to the Citadel Architecture: Security in Physically Exposed Environments," IBM Research Division (1991).

Wobber, Edward, et al., "Authentication in the Taso Operating System," Digital Systems Research Center (1993).

Yee, B., "Using Secure Coprocessors," PhD Thesis, School of Computer Science, Carnegie Mellon University, Pittsburgh, PA (1994).

Yee, B., et al., "Secure Coprocessors in Electronic Commerce Applications," Proceedings of the First USENIX Workshop on Electronic Commerce (1995).

International Search Report of PCT Application No. PCT/US04/03413, Jun. 22, 2007, 2 pages.

Written Opinion of PCT Application No. PCT/US04/03413, Jun. 22, 2007, 3 pages.

International Search Report of PCT Application No. PCT/US04/37050, Jun. 14, 2005, 1 page.

Written Opinion of PCT Application No. PCT/US04/37050, Jun. 14, 2005, 3 pages.

International Search Report of PCT Application No. PCT/US2004/040486, May 8, 2007, 1 page.

Written Opinion of PCT Application No. PCT/US2004/040486, May 8, 2007, 8 pages.

International Search Report of PCT Application No. PCT/US2007/010797, Aug. 5, 2008, 1 page.

Written Opinion of PCT Application No. PCT/US2007/010797, Aug. 5, 2008, 3 pages.

International Search Report of PCT Application No. PCT/US2007/010601, Apr. 24, 2008, 1 page.

Written Opinion of PCT Application No. PCT/US2007/010601, Apr. 24, 2008, 4 pages.

International Search Report of PCT Application No. PCT/US07/19862, May 28, 2008, 1 page.

Written Opinion of PCT Application No. PCT/US07/19862, May 28, 2008, 6 pages.

International Search Report of PCT Application No. PCT/US2007/020074, Oct. 8, 2008, 3 pages.

Written Opinion of PCT Application No. PCT/US07/19862, Oct. 8, 2008, 6 pages.

Co-pending U.S. Appl. No. 10/360,827, filed Feb. 7, 2003.
Co-pending U.S. Appl. No. 11/048,515, filed Jan. 31, 2005.
Co-pending U.S. Appl. No. 10/463,224, filed Jun. 16, 2003.
Co-pending U.S. Appl. No. 10/703,149, filed Nov. 5, 2003.
Co-pending U.S. Appl. No. 11/203,357, filed Aug. 12, 2005.
Co-pending U.S. Appl. No. 11/203,358, filed Aug. 12, 2005.
Co-pending U.S. Appl. No. 12/330,487, filed Dec. 8, 2008.
Co-pending U.S. Appl. No. 10/727,332, filed Dec. 2, 2003.
Co-pending U.S. Appl. No. 11/416,361, filed May 1, 2006.
Co-pending U.S. Appl. No. 12/281,977, filed Jul. 13, 2009.
Co-pending U.S. Appl. No. 11/586,446, filed Oct. 24, 2006.
Co-pending U.S. Appl. No. 12/576,243, filed Oct. 9, 2009.
Co-pending U.S. Appl. No. 11/601,323, filed Nov. 16, 2006.
Co-pending U.S. Appl. No. 12/576,356, filed Oct. 9, 2009.
Co-pending U.S. Appl. No. 12/576,904, filed Oct. 9, 2009.
Co-pending U.S. Appl. No. 12/507,050, filed Jul. 21, 2009.
Notice of Allowance Mailed Aug. 28, 2007 in Co-Pending U.S. Appl. No. 10/360,827, filed Feb. 7, 2003.
Final Office Action Mailed Mar. 8, 2007 in Co-Pending U.S. Appl. No. 10/360,827, filed Feb. 7, 2003.
Non-Final Office Action Mailed Sep. 7, 2006 in Co-Pending U.S. Appl. No. 10/360,827, filed Feb. 7, 2003.
Notice of Allowance Mailed Dec. 20, 2007 in Co-Pending U.S. Appl. No. 11/048,515, filed Jan. 31, 2005.
Non-Final Office Action Mailed Sep. 7, 2007 in Co-Pending U.S. Appl. No. 11/048,515, filed Jan. 31, 2005.
Final Office Action Mailed Mar. 8, 2007 in Co-Pending U.S. Appl. No. 11/048,515, filed Jan. 31, 2005.
Non-Final Office Action Mailed Sep. 7, 2006 in Co-Pending U.S. Appl. No. 11/048,515, filed Jan. 31, 2005.
Final Office Action Mailed Apr. 10, 2009 in Co-pending U.S. Appl. No. 10/463,224, filed Jun. 16, 2003.
Non-Final Office Action Mailed Oct. 3, 2008 in Co-pending U.S. Appl. No. 10/463,224, filed Jun. 16, 2003.
Final Office Action Mailed Apr. 28, 2008 in Co-pending U.S. Appl. No. 10/463,224, filed Jun. 16, 2003.
Non-Final Office Action Mailed Apr. 18, 2007 in Co-pending U.S. Appl. No. 10/463,224, filed Jun. 16, 2003.
Advisory Action Mailed Jan. 18, 2008 in Co-pending U.S. Appl. No. 10/703,149, filed Nov. 5, 2003.
Final Office Action Mailed Sep. 10, 2007 in Co-pending U.S. Appl. No. 10/703,149, filed Nov. 5, 2003.
Non-Final Office Action Mailed Mar. 22, 2007 in Co-pending U.S. Appl. No. 10/703,149, filed Nov. 5, 2003.
Final Office Action Mailed May 4, 2006 in Co-pending U.S. Appl. No. 10/703,149, filed Nov. 5, 2003.
Non-Final Office Action Mailed Nov. 2, 2005 in Co-pending U.S. Appl. No. 10/703,149, filed Nov. 5, 2003.
Notice of Allowance Mailed Oct. 3, 2008 in Co-pending U.S. Appl. No. 11/203,357, filed Aug. 12, 2005.
Final Office Action Mailed Oct. 31, 2007 in Co-pending U.S. Appl. No. 11/203,357, filed Aug. 12, 2005.
Non-Final Office Action Mailed May 8, 2007 in Co-pending U.S. Appl. No. 11/203,357, filed Aug. 12, 2005.
Final Office Action Mailed Dec. 11, 2006 in Co-pending U.S. Appl. No. 11/203,357, filed Aug. 12, 2005.
Non-Final Office Action Mailed Jun. 14, 2006 in Co-pending U.S. Appl. No. 11/203,357, filed Aug. 12, 2005.
Final Office Action Mailed Jun. 18, 2007 in Co-pending U.S. Appl. No. 11/203,358, filed Aug. 12, 2005.

(56) References Cited

OTHER PUBLICATIONS

Non-Final Office Action Mailed Dec. 14, 2006 in Co-pending U.S. Appl. No. 11/203,358, filed Aug. 12, 2005.
Non-Final Office Action Mailed May 18, 2006 in Co-pending U.S. Appl. No. 11/203,358, filed Aug. 12, 2005.
Non-Final Office Action Mailed Apr. 1, 2010 in Co-pending U.S. Appl. No. 12/330,487, filed Dec. 8, 2008.
Notice of Allowance Mailed Apr. 6, 2010 in Co-pending U.S. Appl. No. 10/727,332, filed Dec. 2, 2003.
Advisory Action Mailed May 11, 2009 in Co-pending U.S. Appl. No. 10/727,332, filed Dec. 2, 2003.
Final Office Action Mailed Feb. 3, 2009 in Co-pending U.S. Appl. No. 10/727,332, filed Dec. 2, 2003.
Non-Final Office Action Mailed Jul. 9, 2008 in Co-pending U.S. Appl. No. 10/727,332, filed Dec. 2, 2003.
Final Office Action Mailed Nov. 26, 2007 in Co-pending U.S. Appl. No. 10/727,332, filed Dec. 2, 2003.
Non-Final Office Action Mailed May 9, 2007 in Co-pending U.S. Appl. No. 10/727,332, filed Dec. 2, 2003.
Final Office Action Mailed Nov. 9, 2006 in Co-pending U.S. Appl. No. 10/727,332, filed Dec. 2, 2003.
Non-Final Office Action Mailed Mar. 29, 2006 in Co-pending U.S. Appl. No. 10/727,332, filed Dec. 2, 2003.
Non-Final Office Action Mailed Mar. 13, 2009 in Co-pending U.S. Appl. No. 11/416,361, filed May 1, 2006.
Notice of Allowance Mailed Jul. 24, 2009 in Co-pending U.S. Appl. No. 11/586,446, filed Oct. 24, 2006.
Final Office Action Mailed Jan. 12, 2009 in Co-pending U.S. Appl. No. 11/586,446, filed Oct. 24, 2006.
Non-Final Office Action Mailed May 21, 2008 in Co-pending U.S. Appl. No. 11/586,446, filed Oct. 24, 2006.
Notice of Allowance Mailed Aug. 13, 2009 in Co-pending U.S. Appl. No. 11/601,323, filed Nov. 16, 2006.
Final Office Action Mailed Apr. 30, 2009 in Co-pending U.S. Appl. No. 11/601,323, filed Nov. 16, 2006.
Non-Final Office Action Mailed Sep. 12, 2008 in Co-pending U.S. Appl. No. 11/601,323, filed Nov. 16, 2006.

* cited by examiner

CERTIFICATE VERIFICATION

CROSS-REFERENCE TO RELATED APPLICATION

This Divisional Application claims priority to U.S. patent application Ser. No. 11/601,323, filed Nov. 16, 2006, entitled METHOD FOR PROGRAMMING ON-CHIP NON-VOLATILE MEMORY IN A SECURE PROCESSOR, AND A DEVICE SO PROGRAMMED, which claims priority to U.S. Provisional Patent Application No. 60/857,840, filed Nov. 9, 2006, entitled METHOD FOR PROGRAMMING ON-CHIP NON-VOLATILE MEMORY IN A SECURE PROCESSOR, AND A DEVICE SO PROGRAMMED and each of the aforementioned applications is incorporated in its entirety.

BACKGROUND

A secure processor typically includes an ID and/or stored secret key. In order to enhance the level of security, the quantities could be programmed in chip-internal non-volatile memory to build a secure processor. The programming of the ID and secret key happen during the secure manufacturing process of the chip. Each ID is unique, and so is the private key. These quantities are used in applications on the device, to implement digital rights management and other security related applications. Typically, the chip includes mechanisms to generate cryptographically strong random numbers to use as nonces in network protocols, secret keys etc.

In a typical infrastructure used for implementing digital rights management, a server is used to supply digitally signed tickets to enable rights for the device. Such tickets use the device identities and/or secret key mechanisms to bind the tickets to the devices. In order to ensure the uniqueness of each device ID/key the server typically uses a secure database to store the IDs, (and/or signed certificates) corresponding to each chip that is manufactured. These certificates contain public keys corresponding to each secret key (private key of a (private, public) key pair) programmed in the chip. In order to populate the database with certificates, the infrastructure associated with the database should be securely coupled with the manufacturing process to maintain a one-to-one correspondence between manufactured chips and certificates in the database.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

An improved secure programming technique involves reducing the size of bits programmed in on-chip secret non-volatile memory, at the same time enabling the typical secure applications supported by secure devices. Another improved secure programming technique involves simplifying the process of manufacture of the system. In an embodiment, programming the secrets is isolated to on-chip programming, and, specifically, is isolated from the processes of system integration and infrastructure setup.

A technique for secure programming involves de-coupling chip manufacture from the later process of connecting to ticket servers to obtain tickets. A method according to the technique may involve sending a (manufacturing) server signed certificate from the device prior to any communication to receive tickets. The method may further include populating a database to facilitate performing ticket services later, for example just when the ticket services are needed.

A device according to the technique may include chip-internal non-volatile memory to store the certificate along with the private key, in the manufacturing process. The private key may or may not be an elliptic curve based private key. An advantage of the elliptic curve cryptography based key is that it is smaller than many other types of keys for the relative cryptographic strength. Further, it is possible, using elliptic curve algorithms, to store a random private key and compute the public key by a run-time computation.

Advantageously, especially considering the value of on-chip real estate, a compressed certificate can be provided in the non-volatile memory. Using a smaller data-set (than what would be required to store a device certificate) the device dynamically generates a certificate on the device, to provide to a requesting application. The device certificate may or may not be generated multiple times. For example, the device certificate could be generated once and stored in system external storage for further use. This is not particularly insecure because the certificate is public data.

A device constructed according to the technique may have applicability in other areas. For example, the device could be authenticated to a peer, or to any application that requires a first device certificate. In another alternative, the non-volatile memory may include a secure random number generator for the device, using the secure manufacturing process to program the non-volatile memory.

BRIEF DESCRIPTION OF THE DRAWINGS

Embodiments of the inventions are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
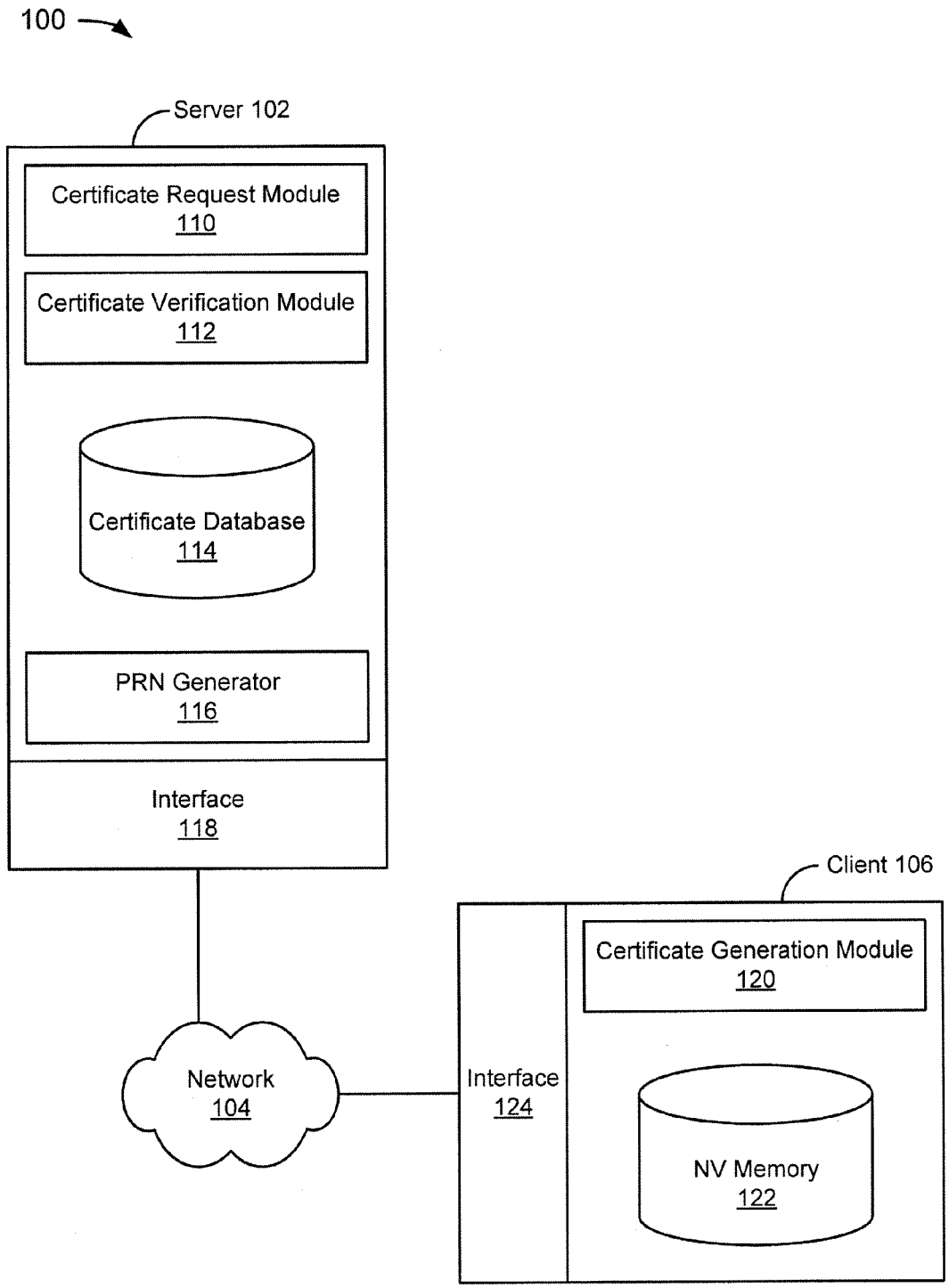
FIG. 1 depicts an example of a system for validating a client at a server.

FIG. 1 depicts an example of a system 100 for validating a client at a server. In the example of FIG. 1, the system 100 includes a server 102, a network 104, and a client 106. The server 102 includes a certificate request module 110, a certificate verification module 112, a Cert database 114, a pseudo-random number (PRN) generator 116, and an interface 118. The client 106 includes a certificate generation module 120, non-volatile (NV) memory 122, and an interface 124.

The server 102 may be any applicable known or convenient computer. The network 104 may be any communications network including, by way of example but not limitation, the Internet. The client 106 may be any applicable known or convenient computer that has secure storage. The NV memory 122 may include a secure key store and, in an embodiment, the NV memory 122 is on-chip memory.

In the example of FIG. 1, in operation, a protocol for registration or activation is initiated by the server 102. (The client 106 may, in an alternative, initiate the registration or activation.) In an embodiment, the protocol serves to register a device identity and certificate into the cert database 114. To do so, the PRN generator 116 generates a PRN, R, and the certificate request module 110 of the server 102 generates a request for a device certificate. R and the request for a device certificate are sent via the interface 118 to the network 104.

R and the request for a device certificate are received at the interface 124 of the client 106. The certificate generation module 120 of the client 106 generates a certificate Cert. An example of the algorithm used to generate Cert is described with reference to FIG. 7, below. The certificate generation module 120 computes a signature Sig, over random number R, using a device private key. Operands are stored in the NV memory 122, which may reside in, for example, a secure kernel (see e.g., FIG. 5). In an alternative, the computation could include a device ID, serial number, region code, or some other value. The interface 124 of the client 106 returns R, any optional data, Cert, and Sig to the network 104.

The interface 118 receives at the server 102 R, any optional data, Cert, and Sig. The certificate verification module 112 at the server 102 validates Cert using a trusted certificate chain, validates Sig using Cert, and verifies that R is the same as the value, R, that was originally sent by the server 102 to the client 106. If successfully validated and verified, the server 102 imports Cert into the Cert database 116. At this point, the client 106 is presumably authorized to obtain from the server 102—or some other location that can use the certificate to authorize the client 106—digital licenses for rights managed content, and other operations.

In another embodiment, the device could generate a new key pair {pvt1,pub1} using a RNG, and a certificate could be created for the new public key pub1, using the device programmed private key as signer. This new key pvt1 could be used to sign the message having the random R.

It should be noted that secure networking protocols such as SSL and other services that require ephemeral secret keys typically make use of a source of a string of random numbers. A secure manufacturing process, such as is described by way of example but not limitation with reference to FIG. 6, below, can be used to seed a secret random number S in a device. A PRN generating algorithm using cryptographic primitives such as the functions in AES or SHA can be used to generate PRNs. The sequence should not repeat after power-cycle of the device. Using a state-saving mechanism involving the chip non-volatile memory ensures a high level of security. The device uses a part of re-writeable non-volatile memory to store a sequence number.

Figure 2:
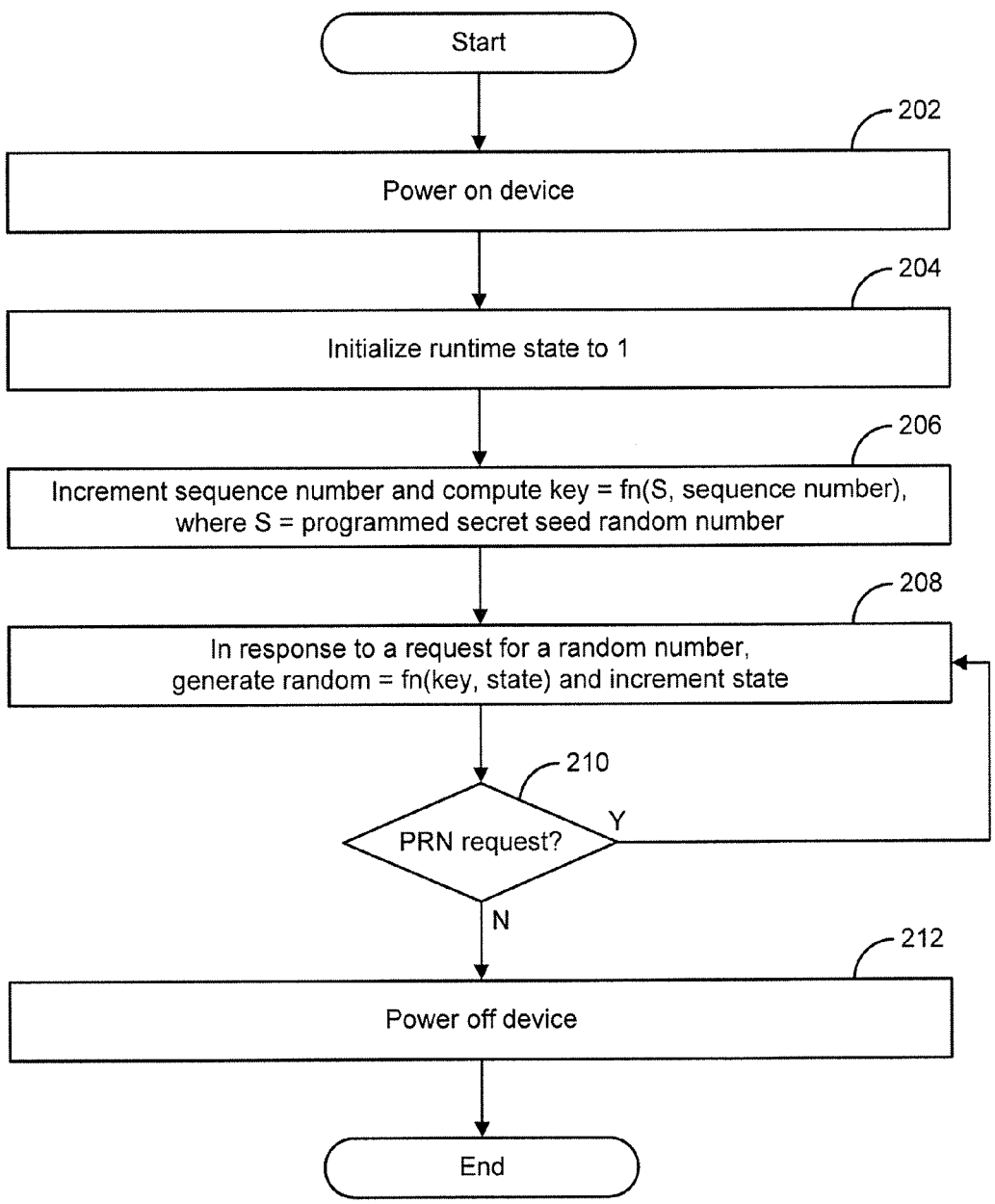
FIG. 2 depicts a flowchart of an example of a method for power up and power down of a device appropriate for use in the system.

FIG. 2 depicts a flowchart 200 of an example of a method for power up and power down of a device appropriate for use in the system 100. In the example of FIG. 2, the flowchart 200 starts at module 202 where a device is powered on. In the example of FIG. 2, the flowchart 200 continues to module 204 where runtime state is initialized to 1. Since the runtime state is incremented over time, the runtime state should be stored in writable memory, such as on-chip writable memory.

In the example of FIG. 2, the flowchart 200 continues to module 206 where the device increments the sequence number and computes key=fn(S, sequence number), where S=a programmed secret seed random number. Since S is programmed, it can be stored in on-chip NV read-only memory (ROM). At this point, the device is presumed to be "up and running."

In the example of FIG. 2, the flowchart 200 continues to module 208 where, in response to a request for a random number, the device generates random=fn(key, state) and increments state: state++. In the example of FIG. 2, the flowchart 200 continues to decision point 210 where it is determined whether another random number request is received. If it is determined that another random number request has been received (210-Y), then the flowchart 200 returns to module 208. In this way, module 208 may be repeated multiple times for multiple random number requests.

When it is determined there are no other random number requests (210-N), the flowchart 200 continues to module 212 where the device is powered off, and the state is lost. Thus, the flowchart 200 illustrates the state of the device from power on to power off. If the device is powered on again, a new key must be computed, and state initialized again.

Figure 3:
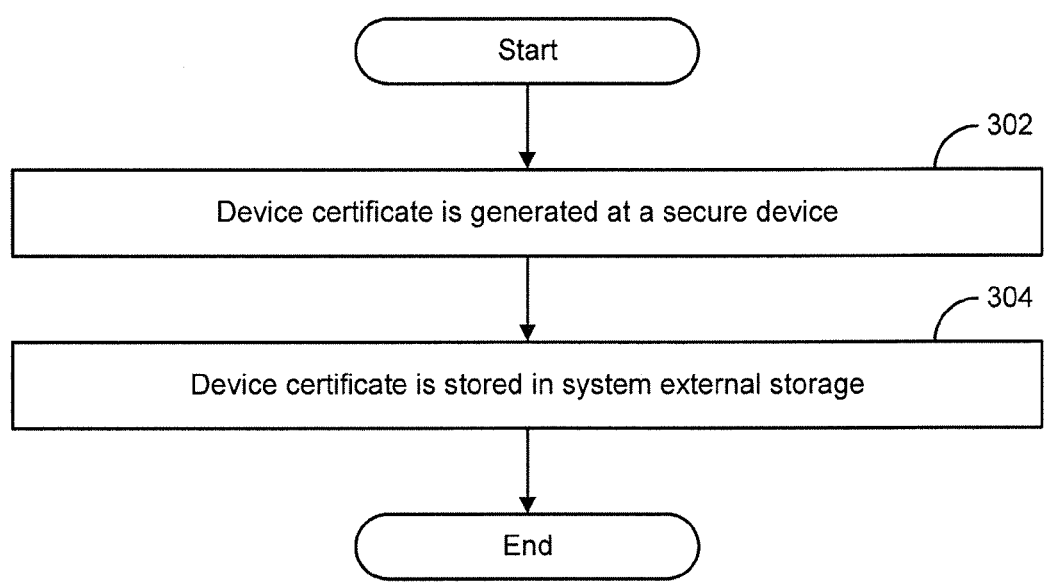
FIG. 3 depicts a flowchart of an example of a method for generating a device certificate only once.

FIG. 3 depicts a flowchart 300 of an example of a method for generating a device certificate only once. In the example of FIG. 3, the flowchart 300 starts at module 302 where a device certificate is generated at a secure device. The flowchart 300 continues to module 304 where the device certificate is stored in system external storage. This variation is notable because the device is secure, but the device certificate is public. Accordingly, the certificate is still secure, even though it is not regenerated each time.

Figure 4:
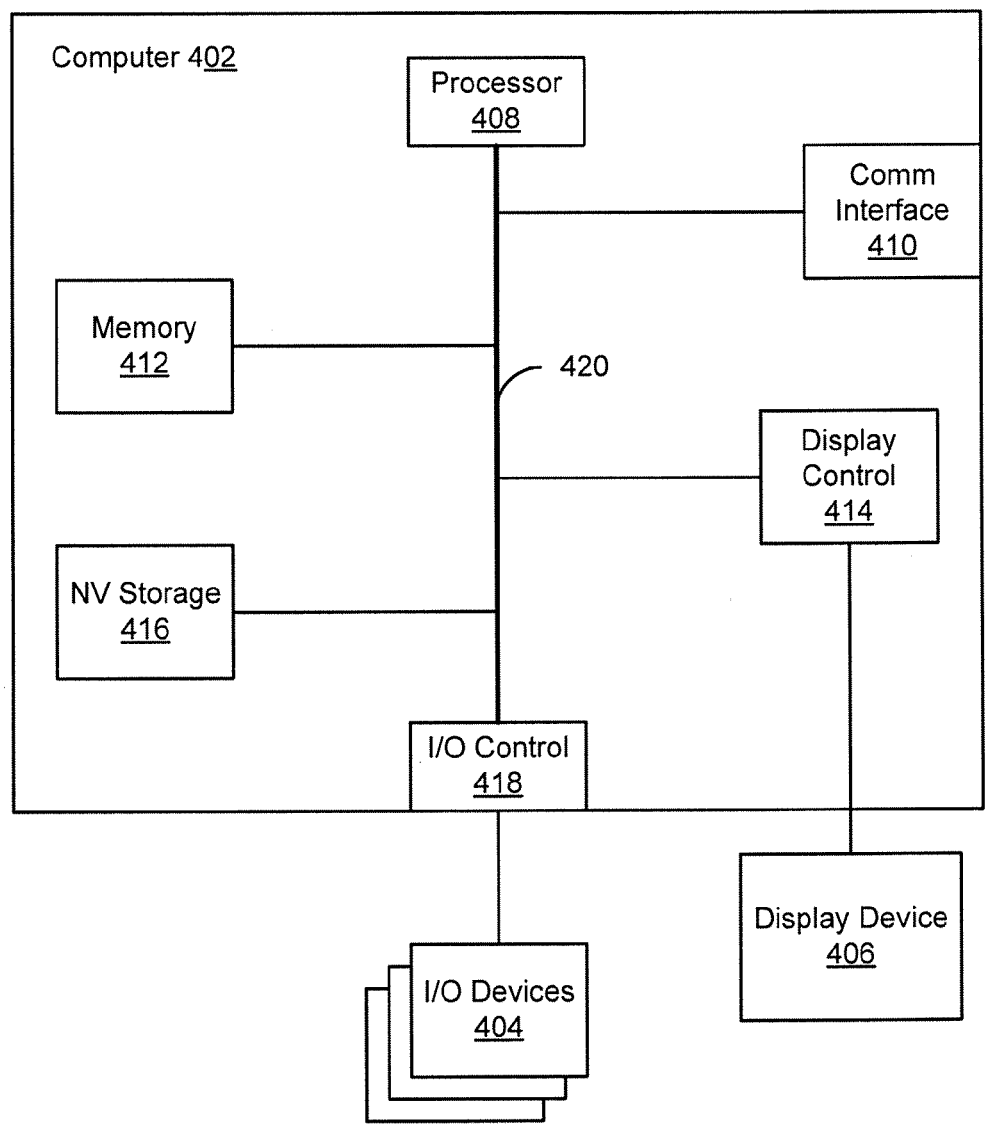
FIG. 4 depicts a computer system suitable for implementation of the techniques described above with reference to FIGS. 1-3.

FIG. 4 depicts a computer system 400 suitable for implementation of the techniques described above with reference to FIGS. 1-3. The computer system 400 includes a computer 402, I/O devices 404, and a display device 406. The computer 402 includes a processor 408, a communications interface 410, memory 412, display controller 414, non-volatile storage 416, and I/O controller 418. The computer 402 may be coupled to or include the I/O devices 404 and display device 406.

The computer 402 interfaces to external systems through the communications interface 410, which may include a modem or network interface. The communications interface 410 can be considered to be part of the computer system 400 or a part of the computer 402. The communications interface 410 can be an analog modem, ISDN modem, cable modem, token ring interface, satellite transmission interface (e.g. "direct PC"), or other interfaces for coupling a computer system to other computer systems. Although conventional computers typically include a communications interface of some type, it is possible to create a computer that does not include one, thereby making the communications interface 410 optional in the strictest sense of the word.

The processor 408 may include, by way of example but not limitation, a conventional microprocessor such as an Intel Pentium microprocessor or Motorola power PC microprocessor. While the processor 408 is a critical component of all conventional computers, any applicable known or convenient processor could be used for the purposes of implementing the techniques described herein. The memory 412 is coupled to the processor 408 by a bus 420. The memory 412, which may be referred to as "primary memory," can include Dynamic Random Access Memory (DRAM) and can also include Static RAM (SRAM). The bus 220 couples the processor 408 to the memory 412, and also to the non-volatile storage 416, to the display controller 414, and to the I/O controller 418.

The I/O devices 404 can include a keyboard, disk drives, printers, a scanner, and other input and output devices, including a mouse or other pointing device. For illustrative purposes, at least one of the I/O devices is assumed to be a block-based media device, such as a DVD player. The display controller 414 may control, in a known or convenient manner, a display on the display device 406, which can be, for example, a cathode ray tube (CRT) or liquid crystal display (LCD).

The display controller 414 and I/O controller 418 may include device drivers. A device driver is a specific type of computer software developed to allow interaction with hardware devices. Typically this constitutes an interface for communicating with the device, through a bus or communications subsystem that the hardware is connected to, providing commands to and/or receiving data from the device, and on the other end, the requisite interfaces to the OS and software applications.

The device driver may include a hardware-dependent computer program that is also OS-specific. The computer program enables another program, typically an OS or applications software package or computer program running under the OS kernel, to interact transparently with a hardware device, and usually provides the requisite interrupt handling necessary for any necessary asynchronous time-dependent hardware interfacing needs.

The non-volatile storage 416, which may be referred to as "secondary memory," is often a magnetic hard disk, an optical disk, or another form of storage for large amounts of data. Some of this data is often written, by a direct memory access process, into memory 412 during execution of software in the computer 402. The non-volatile storage 416 may include a block-based media device. The terms "machine-readable medium" or "computer-readable medium" include any known or convenient storage device that is accessible by the processor 408 and also encompasses a carrier wave that encodes a data signal.

The computer system 400 is one example of many possible computer systems which have different architectures. For example, personal computers based on an Intel microprocessor often have multiple buses, one of which can be an I/O bus for the peripherals and one that directly connects the processor 408 and the memory 412 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 412 for execution by the processor 408. A Web TV system, which is known in the art, is also considered to be a computer system, but it may lack some of the features shown in FIG. 4, such as certain input or output devices. A typical computer system will usually include at least a processor, memory, and a bus coupling the memory to the processor.

The computer system 400 may be controlled by an operating system (OS). An OS is a software program—used on most, but not all, computer systems—that manages the hardware and software resources of a computer. Typically, the OS performs basic tasks such as controlling and allocating memory, prioritizing system requests, controlling input and output devices, facilitating networking, and managing files. Examples of operating systems for personal computers include Microsoft Windows®, Linux, and Mac OS®. Delineating between the OS and application software is sometimes rather difficult. Fortunately, delineation is not necessary to understand the techniques described herein, since any reasonable delineation should suffice.

The lowest level of an OS may be its kernel. The kernel is typically the first layer of software loaded into memory when a system boots or starts up. The kernel provides access to various common core services to other system and application programs.

As used herein, algorithmic descriptions and symbolic representations of operations on data bits within a computer memory are believed to most effectively convey the techniques to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer that manipulates and transforms data represented as physical (electronic) quantities within the computer system's registers and memories into other data similarly represented as physical quantities within the computer system memories or registers or other such information storage, transmission or display devices.

An apparatus for performing techniques described herein may be specially constructed for the required purposes, or it may comprise a general purpose computer selectively activated or reconfigured by a computer program stored in the computer. Such a computer program may be stored in a computer readable storage medium, such as, by way of example but not limitation, read-only memories (ROMs), RAMs, EPROMs, EEPROMs, magnetic or optical cards, any type of disk including floppy disks, optical disks, CD-ROMs, DVDs, and magnetic-optical disks, or any known or convenient type of media suitable for storing electronic instructions.

The algorithms and displays presented herein are not inherently related to any particular computer architecture. The techniques may be implemented using any known or convenient programming language, whether high level (e.g., C/C++) or low level (e.g., assembly language), and whether interpreted (e.g., Perl), compiled (e.g., C/C++), or Just-In-Time (JIT) compiled from bytecode (e.g., Java). Any known or convenient computer, regardless of architecture, should be capable of executing machine code compiled or otherwise assembled from any language into machine code that is compatible with the computer's architecture.

Figure 5:
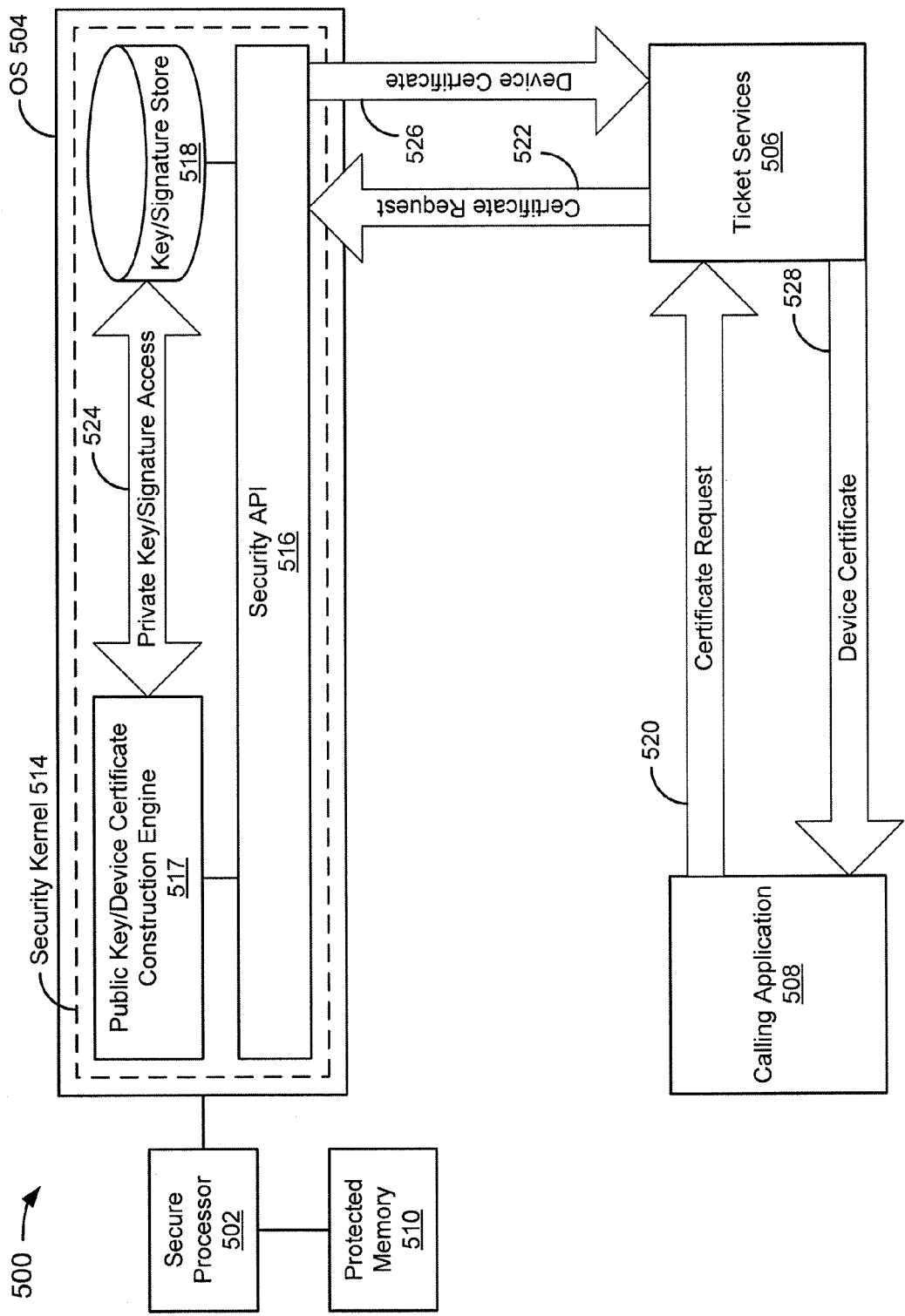
FIG. 5 depicts an example of a secure system suitable for implementation of the techniques described above with reference to FIGS. 1-3.

FIG. 5 depicts an example of a secure system 500 suitable for implementation of the techniques described above with reference to FIGS. 1-3. A typical secure system 500 may include a game console, media player, an embedded secure device, a "conventional" PC with a secure processor, or some other computer system that includes a secure processor.

In the example of FIG. 5, the secure system 500 includes a secure processor 502, an OS 504, ticket services 506, a calling application 508, and protected memory 510. In the example of FIG. 5, the OS 504 includes a security kernel 514, which in turn includes a key store 516, an encryption/decryption engine 517, and a security API 518. It should be noted that one or more of the described components, or portions thereof, may reside in the protected memory 510, or in unprotected memory (not shown).

It should further be noted that the security kernel 514 is depicted as residing inside the OS 504 by convention only. It may or may not actually be part of the OS 504, and could exist outside of an OS or on a system that does not include an OS. For the purposes of illustrative simplicity, it is assumed that the OS 504 is capable of authentication. In an embodiment, the ticket services 506 may also be part of the OS 504. This may be desirable because loading the ticket services 506 with authentication can improve security. Thus, in such an embodiment, the OS 504 is loaded with authentication and includes the ticket services 506.

For illustrative simplicity, protected memory is represented as a single memory. However protected memory may include protected primary memory, protected secondary memory, and/or secret memory. It is assumed that known or convenient mechanisms are in place to ensure that memory is protected. The interplay between primary and secondary memory and/or volatile and non-volatile storage is known so a distinction between the various types of memory and storage is not drawn with reference to FIG. 5.

The ticket services 506 may be thought of as, for example, "digital license validation services" and, in a non-limiting embodiment, may include known or convenient procedures associated with license validation. For example, the ticket services 506 may include procedures for validating digital licenses, PKI validation procedures, etc. In the example of FIG. 5, the ticket services 506 can validate a ticket from the calling application 508. In operation, the ticket services 506 obtains the ticket from the calling application 508, which proceeds to validate the ticket.

It is possible that the ticket is personalized. In that case, it could be decrypted using the device private key (programmed as discussed before) to compute a secret shared encryption key. The ticket may or may not be obtained using an Internet download mechanism and stored on re-writable flash memory.

In an embodiment, the security kernel 514 may be loaded at start-up. In another embodiment, a portion of the security kernel may be loaded at start-up, and the remainder loaded later. An example of this technique is described in application Ser. No. 10/360,827 entitled "Secure and Backward-Compatible Processor and Secure Software Execution Thereon," which was filed on Feb. 7, 2003, by Srinivasan et al., and which is incorporated by reference. Any known or convenient technique may be used to load the security kernel 514 in a secure manner.

The key store 516 is a set of storage locations for keys. The key store 516 may be thought of as an array of keys, though the data structure used to store the keys is not critical. Any applicable known or convenient structure may be used to store the keys. In a non-limiting embodiment, the key store 516 is initialized with static keys, but variable keys are not initialized (or are initialized to a value that is not secure). For example, some of the key store locations are pre-filled with trusted values (e.g., a trusted root key) as part of the authenticated loading of the security kernel 514. The private key in the non-volatile memory could be retrieved and stored in the keystore for future use.

The encryption/decryption engine 517 is, in an embodiment, capable of both encryption and decryption. For example, in operation, an application may request of the security API 518 a key handle that the application can use for encryption. The encryption/decryption engine 517 may be used to encrypt data using the key handle. Advantageously, although the security API 518 provides the key handle in the clear, the key itself never leaves the security kernel 514.

The security API 518 is capable of performing operations using the keys in the key store 516 without bringing the keys out into the clear (i.e., the keys do not leave the security kernel 514 or the keys leave the security kernel 514 only when encrypted). The security API 518 may include services to create, populate and use keys (and potentially other security material) in the key store 516. In an embodiment, the security API 518 also provides access to internal secrets and non-volatile data, including secret keys and device private key. For example, the device private key might be stored in the keystore and used by the security API. One API call could be used to return a device certificate (using an algorithm discussed herein to generate the certificate). Another API call can be constructed to use the private key to compute a shared key for decryption, or use the private key to sign a message or certificate. Depending upon the implementation, the security API 518 may support AES and SHA operations using hardware acceleration.

In the example of FIG. 5, the ticket services 506 and the security API 518 may execute in a separate execution space for system security. In order to validate data blocks, the ticket services 506 may validate the ticket using data in the header. The ticket may include an encrypted key. The ticket services 506 decrypts the key using services in the security kernel 514 (e.g., the encryption/decryption engine 517).

In an embodiment, the encryption/decryption engine 517 uses secret common keys from the key store 518 to perform this decryption. In another embodiment, the ticket services 506 could use a device personalized ticket obtained from flash or network (not shown), validate some rights to content, and then return the key. In any case, this process returns the key. The personalized ticket could be encrypted by a key that is a function of the device private key, programmed in the non-volatile memory.

An example of data flow in the system 500 is provided for illustrative purposes as arrows 520-528. Receiving the certificate request at the ticket services 506 is represented by a certificate request arrow 520 from the calling application 508 to the ticket services 506.

Forwarding the certificate request from the ticket services 506 to the security API 516 is represented by a certificate request arrow 522. Within the security kernel 514, the public key/device certificate construction engine 517 accesses keys/signature data from the key/signature store 518. The access is represented by the private key/signature access arrow 524. The security API 516 returns a device certificate to the ticket services 506, as represented by the device certificate arrow 526, which is forwarded to the calling application 508, as represented by the device certificate arrow 528.

Figure 6:
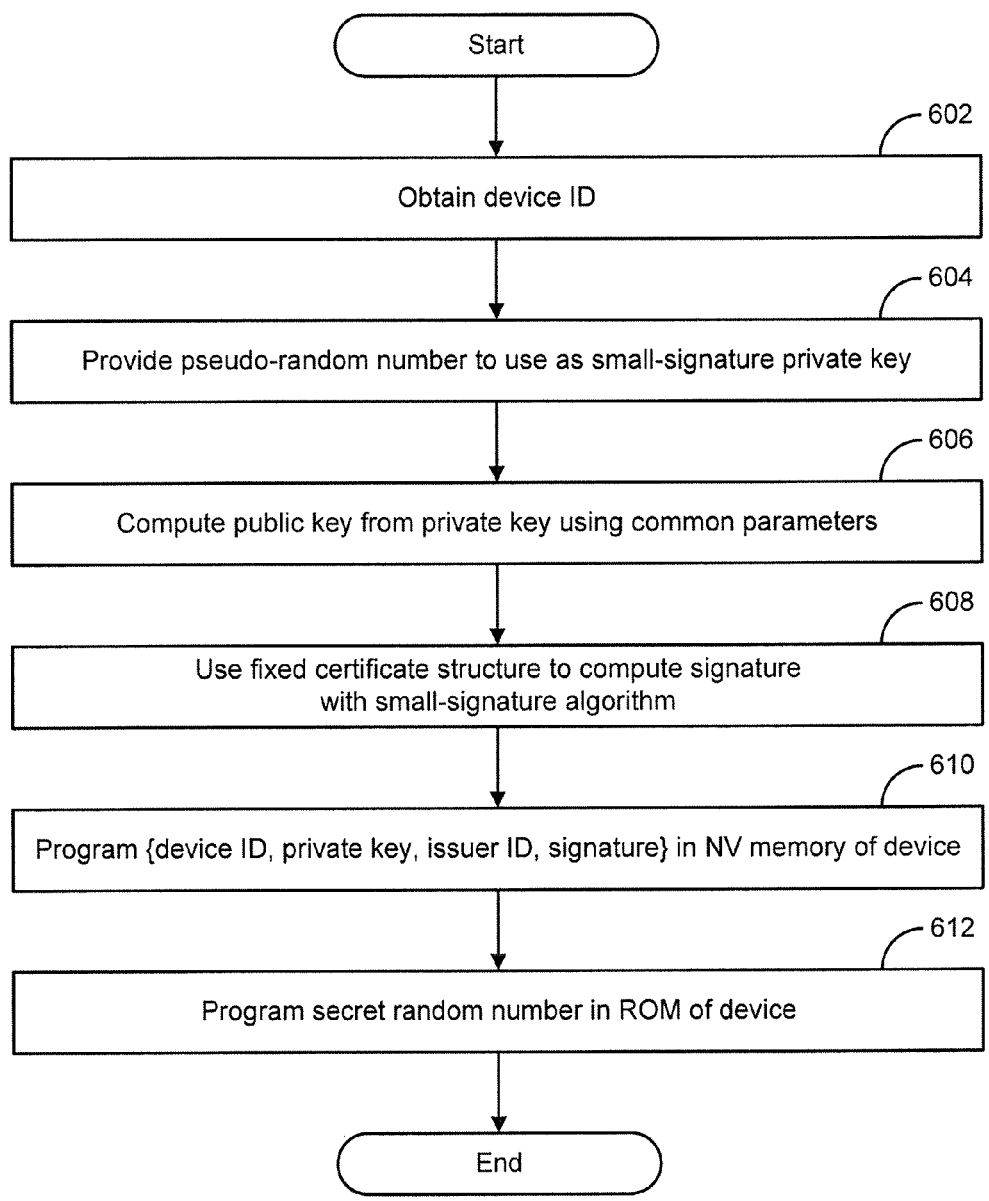
FIG. 6 depicts a flowchart of an example of a method for manufacturing a secure device.

FIG. 6 depicts a flowchart 600 of an example of a method for manufacturing a secure device. This method and other methods are depicted as serially arranged modules. However, modules of the methods may be reordered, or arranged for parallel execution as appropriate. In the example of FIG. 6, the flowchart 600 begins at module 602 where a device ID is obtained. The device ID may be a serial number or some other unique identifier for the device.

In the example of FIG. 6, the flowchart 600 continues to module 604 where a pseudo-random number is provided for use as a small-signature private key for the device. To date, truly random numbers are not generable on a computer; of course, a pseudo-random number generator or an external secured hardware true random number generator could work for the intended purpose. A small-signature private key may be, by way of example but not limitation, an elliptic curve private key, or some other private key with a relatively small footprint.

In the example of FIG. 6, the flowchart 600 continues to module 606 where a public key is computed from the private key using common parameters. For example, a multiple of a base point may be computed, where a scalar multiple is the private key.

In the example of FIG. 6, the flowchart 600 continues to module 608 where a fixed certificate structure is used to construct a certificate. The certificate is signed using a small signature algorithm such as elliptic curve DSA. In an embodiment, the fixed certificate structure may include at least the device ID, issuer name, and device public key. A small-signature algorithm is used to minimize the size of the signature. By way of example but not limitation, an elliptic curve signature algorithm may be used.

In the example of FIG. 6, the flowchart 600 continues to module 610 where {device ID, private key, issuer ID, signature} is programmed into the non-volatile memory of the device. This set includes these four items because the items provide sufficient security for most purposes, and the set has a relatively small footprint due to the relatively small size of the private key and signature. (The device ID and issuer ID also, presumably, have relatively small footprints.) In an embodiment, any other data that is needed to construct the device certificate such as the public key may be generated programmatically on demand. However, more items could be programmed into the non-volatile memory, or fewer, as appropriate for a given embodiment or implementation.

In the example of FIG. 6, the flowchart 600 continues to module 612 where a secret random number is programmed into the ROM of the device. The secret random number may be pseudo-randomly generated or arbitrarily assigned. This secret random number can be used to support secure pseudo-random number generation. In an alternative, the ROM may be replaced with some other known or convenient NV storage.

Figure 7:
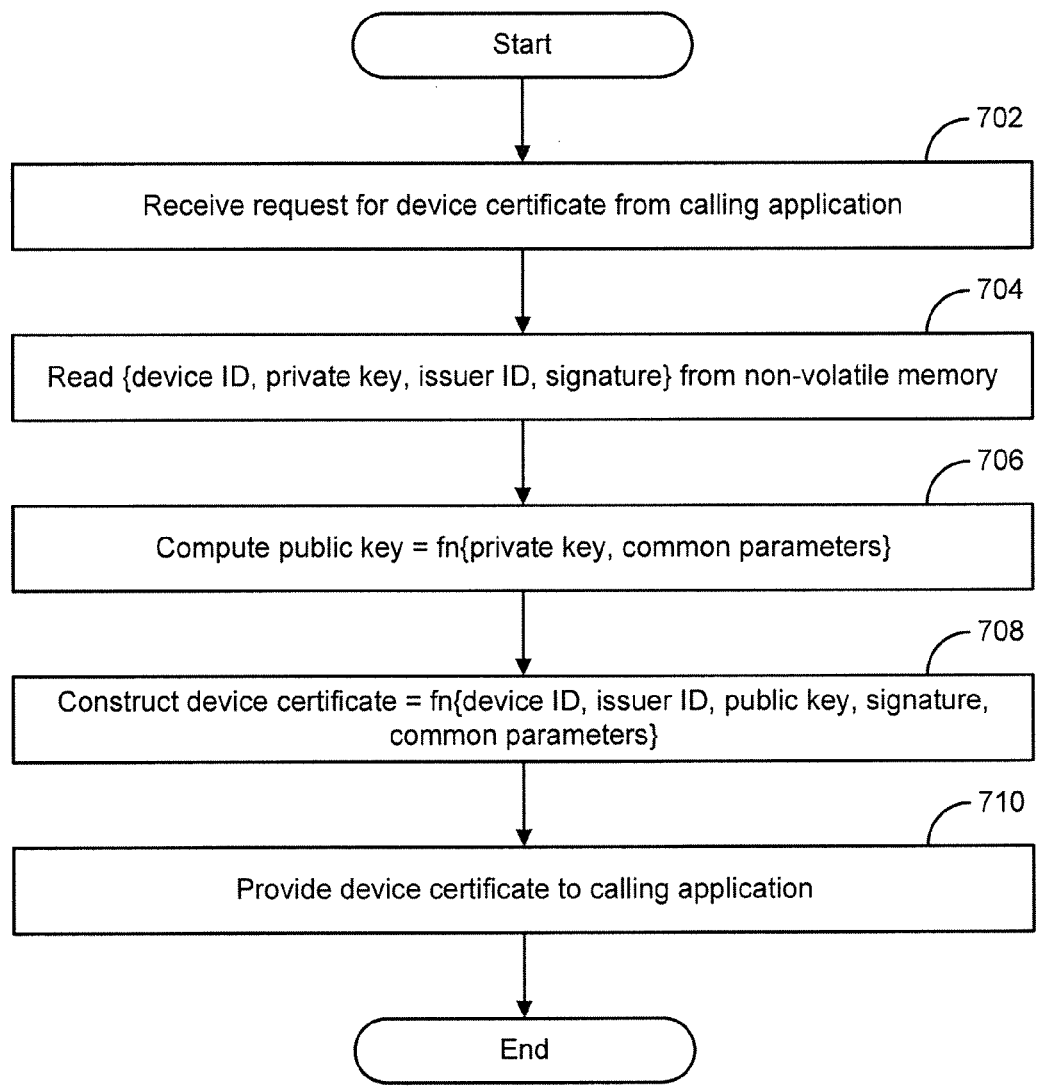
FIG. 7 depicts a flowchart of an example of a method for construction of a secure certificate.

FIG. 7 depicts a flowchart 700 of an example of a method for construction of a secure certificate. Advantageously, the method enables the device having the non-volatile programmed key and required software to construct a full device certificate that can be used to validate the device. In the example of FIG. 7, the flowchart 700 starts at module 702 where a request for a device certificate is received from a calling application.

In the example of FIG. 7, the flowchart 700 continues to module 704 where {device ID, private key, issuer ID, signature} is read from non-volatile memory. In an embodiment, a security kernel module accesses and reads the non-volatile memory. An example of a security kernel module that is appropriate for this purpose is described in U.S. patent application Ser. No. 10/360,827 entitled "Secure and Backward-Compatible Processor and Secure Software Execution Thereon," which was filed on Feb. 7, 2003, by Srinivasan et al., and/or in U.S. patent application Ser. No. 11/586,446 entitled "Secure Device Authentication System and Method," which was filed on Oct. 24, 2006, by Srinivasan et al., both of which are incorporated by reference. However, any applicable known or convenient security kernel module could be used.

In the example of FIG. 7, the flowchart 700 continues to module 706 where the public key is computed from the private key and common parameters, if any. In an embodiment, the computation makes use of the same algorithm that was used in a manufacturing process, such as the method described with reference to FIG. 6, above. The public key may be computed in a security kernel.

In the example of FIG. 7, the flowchart 700 continues to module 708 where a device certificate is constructed from device ID, issuer ID, public key, signature, and common parameters. In an embodiment, a security kernel module is aware of the structure of the device certificate, as is used in a manufacturing process, such as the method described with reference to FIG. 6, above. Advantageously, the device certificate can be constructed on demand.

In the example of FIG. 7, the flowchart 700 continues to module 710 where the device certificate is provided to the calling application. The flowchart 700 ends when the device certificate is provided to the calling application. The method could be started again by another calling application (or by the same calling application if, for some reason, the device certificate was needed again.)

As used herein, the term "content" is intended to broadly include any data that can be stored in memory.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A server comprising:
   a number generator;
   a certificate request module;
   a certificate verification module;
   an interface, coupled to the number generator, the certificate request module, and the certificate verification module,
   wherein, in operation:
   the number generator generates a first number;
   the certificate request module generates a request for a device certificate;
   the first number and the request for a device certificate are sent via the interface;
   a response that includes a second number, a second signature that is generated using the second number, and a device certificate computed as a function of a device identifier (ID), an issuer ID, the second signature, and a public key are received at the interface; and the certificate verification module validates the device certificate and the second signature, and verifies that the first number and the second number match.

2. The server of claim 1, wherein the public key is computed from a private key.

3. The server of claim 2, wherein the private key is an elliptic curve private key.

4. The server of claim 1, wherein the interface receives the signature and the certificate validation module validates the signature using the device certificate.

5. The server of claim 1, wherein the number generator is a pseudo-random number generator.

6. The server of claim 1, wherein the number generator is a true random number generator.

7. The server of claim 1, wherein, in operation, the certificate verification module validates the device certificate using a trusted certificate chain.

8. The server of claim 1, further comprising a certificate database, wherein the device certificate is imported to the certificate database if validated by the certificate verification module.

9. A server comprising:
a means for generating a first number;
a means for generating a request for a device certificate;
a means for sending the first number and the request for a device certificate;
a means for receiving a response that includes a second number, a second signature that is generated using the second number, and a device certificate computed as a function of a device identifier (ID), an issuer ID, the second signature, and a public key;
a means for validating the device certificate and the second signature;
a means for verifying that the first number and the second number match.

10. The server of claim 9, further comprising:
a means for receiving the signature;
a means for validating the signature using the device certificate.

11. The server of claim 9, further comprising generating a pseudo-random number as the first number.

12. The server of claim 9, further comprising generating a true random number as the first number.

13. The server of claim 9, further comprising validating the device certificate using a trusted certificate chain.

14. The server of claim 9, further comprising importing the device certificate to a certificate database after the device certificate is validated.

15. A computer program product including memory storing instructions and a processor for executing the instructions in memory:
a processor;
memory storing modules having instructions, coupled to the processor, including:
a number generation module;
a certificate request module;
a certificate verification module;
wherein, in operation, the processor executes the instructions such that:
the number generation module generates a first number;
the certificate request module generates a request for a device certificate and sends the first number and the request for a device certificate;
the certificate verification module:
receives a response that includes a second number, a second signature that is generated using the second number, and a device certificate computed as a function of a device identifier (ID), an issuer ID, the second signature, and a public key;
validates the device certificate and the second signature; and
verifies that the first number and the second number match.

16. The computer program product of claim 15, wherein the certificate verification module receives the signature and validates the signature using the device certificate.

17. The computer program product of claim 15, wherein the number generation module is a pseudo-random number generation module.

18. The computer program product of claim 15, wherein the number generation module is a true random number generation module.

19. The computer program product of claim 15, wherein the certificate verification module validates the device certificate using a trusted certificate chain.

20. The computer program product of claim 15, further comprising a certificate database, wherein the device certificate is imported to the certificate database if validated by the certificate verification module.

* * * * *